US011536908B2

(12) United States Patent
Puckett et al.

(10) Patent No.: US 11,536,908 B2
(45) Date of Patent: Dec. 27, 2022

(54) MULTILAYER WAVEGUIDE GRATING COUPLER

(71) Applicant: Honeywell International Inc., Charlotte, NC (US)

(72) Inventors: Matthew Wade Puckett, Phoenix, AZ (US); Chad Fertig, Bloomington, MN (US); Neil A. Krueger, Saint Paul, MN (US); Karl D. Nelson, Plymouth, MN (US); Chad Hoyt, Roseville, MN (US)

(73) Assignee: Honeywell International Inc., Charlotte, NC (US)

( * ) Notice: Subject to any disclaimer, the term of this patent is extended or adjusted under 35 U.S.C. 154(b) by 51 days.

(21) Appl. No.: 17/307,757

(22) Filed: May 4, 2021

(65) Prior Publication Data
US 2022/0252792 A1 Aug. 11, 2022

Related U.S. Application Data

(60) Provisional application No. 63/148,275, filed on Feb. 11, 2021.

(51) Int. Cl.
*G02B 6/34* (2006.01)
*G02B 5/18* (2006.01)
(Continued)

(52) U.S. Cl.
CPC ............ *G02B 6/34* (2013.01); *G02B 5/1871* (2013.01); *G02B 6/124* (2013.01); *G02B 6/12004* (2013.01)

(58) Field of Classification Search
CPC .... G02B 6/34; G02B 6/1228; G02B 6/12002; G02B 6/12004; G02B 6/124;
(Continued)

(56) References Cited

U.S. PATENT DOCUMENTS 5,033,812 A 7/1991 Yoshida et al.
5,657,407 A 8/1997 Li et al.
(Continued)

FOREIGN PATENT DOCUMENTS

CN 108776367 A 11/2018
EP 3872537 A1 9/2021

OTHER PUBLICATIONS

European Patent Office, "Extended European Search Report from EP Application No. 21212213.9", from Foreign Counterpart to U.S. Appl. No. 17/307,757, dated Apr. 29, 2022, pp. 1 through 8, Published: EP.

*Primary Examiner* — Michael P Mooney
(74) *Attorney, Agent, or Firm* — Fogg & Powers LLC

(57) ABSTRACT

A multilayer waveguide coupler comprising a first grating and a second grating is provided. Each first copropagating waveguide of the first grating has a first periodically modulated width. Each second copropagating waveguide of the second grating has a second periodically modulated width. The second grating is positioned so that a phase offset is present between the first periodically modulated width of the first copropagating waveguides and the second periodically modulated width of the second copropagating waveguides. The grating spaced distance and phase offset are selected so that light diffracted out of the first copropagating waveguides and the second copropagating waveguides in the first direction interferes constructively to form the first light beam and light diffracted out of the first copropagating waveguides and the second copropagating waveguides in the second direction interferes destructively.

20 Claims, 7 Drawing Sheets

(51) Int. Cl.
*G02B 6/124* (2006.01)
*G02B 6/12* (2006.01)

(58) Field of Classification Search
CPC .............. G02B 6/12011; G02B 5/1857; G02B 5/1871; G02B 5/1828; G02F 1/365
See application file for complete search history.

(56) References Cited

U.S. PATENT DOCUMENTS

| | | |
|---|---|---|
| 9,354,362 B2 | 5/2016 | Li et al. |
| 9,435,961 B2 | 9/2016 | Jiang |
| 10,514,509 B2 | 12/2019 | Popovic et al. |
| 11,215,760 B2 * | 1/2022 | Puckett .............. G02B 6/12011 |
| 2002/0158193 A1 | 10/2002 | Sezginer et al. |
| 2004/0037503 A1 | 2/2004 | Hastings et al. |
| 2005/0254752 A1 | 11/2005 | Domash et al. |
| 2008/0112053 A1 | 5/2008 | Levner et al. |
| 2014/0193115 A1 | 7/2014 | Popovic |
| 2017/0269297 A1 | 9/2017 | Popovic |
| 2018/0059328 A1 * | 3/2018 | Shi ......................... G02B 6/124 |

\* cited by examiner

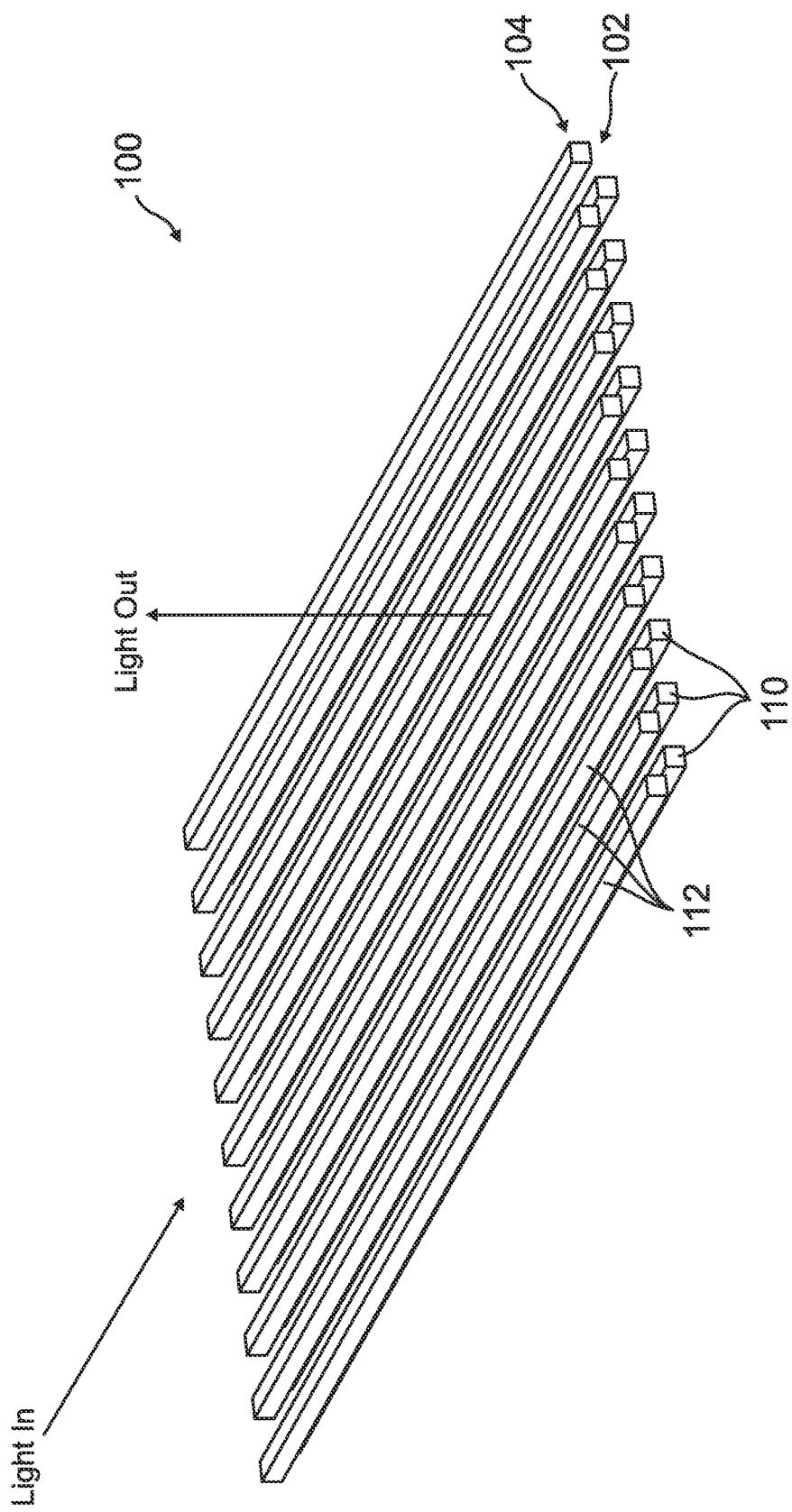

MULTILAYER WAVEGUIDE GRATING COUPLER

CROSS-REFERENCE TO RELATED APPLICATIONS

This application claims priority to U.S. Provisional Application Ser. No. 63/148,275, same title herewith, filed on Feb. 11, 2021, which is incorporated in its entirety herein by reference.

STATEMENT REGARDING FEDERALLY SPONSORED RESEARCH OR DEVELOPMENT

This invention was made with Government support under HR0011-16-C-0122 awarded by DARPA ACES. The Government has certain rights in the invention.

BACKGROUND

A grating coupler is used in integrated photonics to route light from a chip-scale waveguide into free space or vice versa. One challenge faced in the design of grating couplers is the diffraction of light into unwanted spatial modes. Specifically, light diffracted down into the body of the chip rather than up into the area above the chip is highly undesirable since it may result in losing half of the light's power.

To prevent light from being diffracted down into the body of the chip, metal layers have been deposited beneath waveguides to reflect downward-propagating diffraction. While the use of metal layers is effective, the technique is highly unpractical, as the inclusion of metal into the chip design may be forbidden by microfabrication foundries due to concerns over chamber contamination. An effective and efficient manner to deal with unwanted diffraction into the body of the chip without metal layers is desired.

SUMMARY

The following summary is made by way of example and not by way of limitation. It is merely provided to aid the reader in understanding some of the aspects of the subject matter described. Embodiments provide a multilayer waveguide grating coupler to suppress downward-propagating diffraction into a body of a chip.

In one embodiment, a multilayer waveguide coupler comprising a first grating and a second grating is provided. The first grating has a plurality of first copropagating waveguides. Each first copropagating waveguide has a first periodically modulated width. The second grating has a plurality of second copropagating waveguides positioned a grating space distance from the first grating. Each second copropagating waveguide has a second periodically modulated width. The second grating is positioned so that a phase offset is present between the first periodically modulated width of the first copropagating waveguides and the second periodically modulated width of the second copropagating waveguides. The grating spaced distance and phase offset are selected so that light diffracted out of the first copropagating waveguides and the second copropagating waveguides in the first direction interferes constructively to form the first light beam and light diffracted out of the first copropagating waveguides and the second copropagating waveguides in the second direction interferes destructively.

In another example embodiment, a photonics chip with a multilayer waveguide grating coupler is provided. The photonics chip includes a signal source and a multilayer waveguide grating coupler. The signal source is configured to generate an input light. The multilayer waveguide grating coupler is in optical communication with the signal source to receive the input light. The multilayer waveguide grating coupler includes at least one first grating and at least one second grating. The at least one first grating has a plurality of first copropagating waveguides. Each first copropagating waveguide has a first periodically modulated width. The at least one second grating has a plurality of second copropagating waveguides positioned a grating spaced distance from the first grating. Each second copropagating waveguide has a second periodically modulated width. The second grating positioned so that a phase offset is present between the first periodically modulated width of the first copropagating waveguides and the second periodically modulated width of the second copropagating waveguides. The grating spaced distance and the phase offset are selected so that light diffracted in a first direction from the first copropagating waveguides and the second copropagating waveguides interferes constructively to form a first light beam and light diffracted in a second direction from the first copropagating waveguides and the second copropagating waveguides interferes destructively.

In yet another embodiment, a method of forming a multilayer waveguide grating coupler is provided. The method includes depositing a first layer of core material on a first layer of cladding material. Forming a first grating having a plurality of copropagating first waveguides from the first core material. Each first waveguide of the plurality of copropagating first waveguides having a first periodic modulation of a width of the first waveguide. Depositing a second layer of cladding material of a select thickness over the first grating. Depositing a second layer of core material over the second layer of cladding material. Forming a second grating having a plurality of copropagating second waveguides from the second layer of core material. Each second waveguide of the plurality of copropagating second waveguides having a second periodic modulation of a width of the second waveguide. The formed second grating positioned to create a select phase offset between the first periodic modulations of the width of the first waveguides and the second periodic modulations of the width of the second waveguides.

BRIEF DESCRIPTION OF THE DRAWINGS

Embodiments can be more easily understood and further advantages and uses thereof will be more readily apparent, when considered in view of the detailed description and the following figures in which:

FIG. 1 is an illustration of a general arrangement of a multilayer waveguide grating coupler according to one exemplary embodiment;

In accordance with common practice, the various described features are not drawn to scale but are drawn to emphasize specific features relevant to the subject matter described. Reference characters denote like elements throughout Figures and text.

DETAILED DESCRIPTION

Figure 2A:
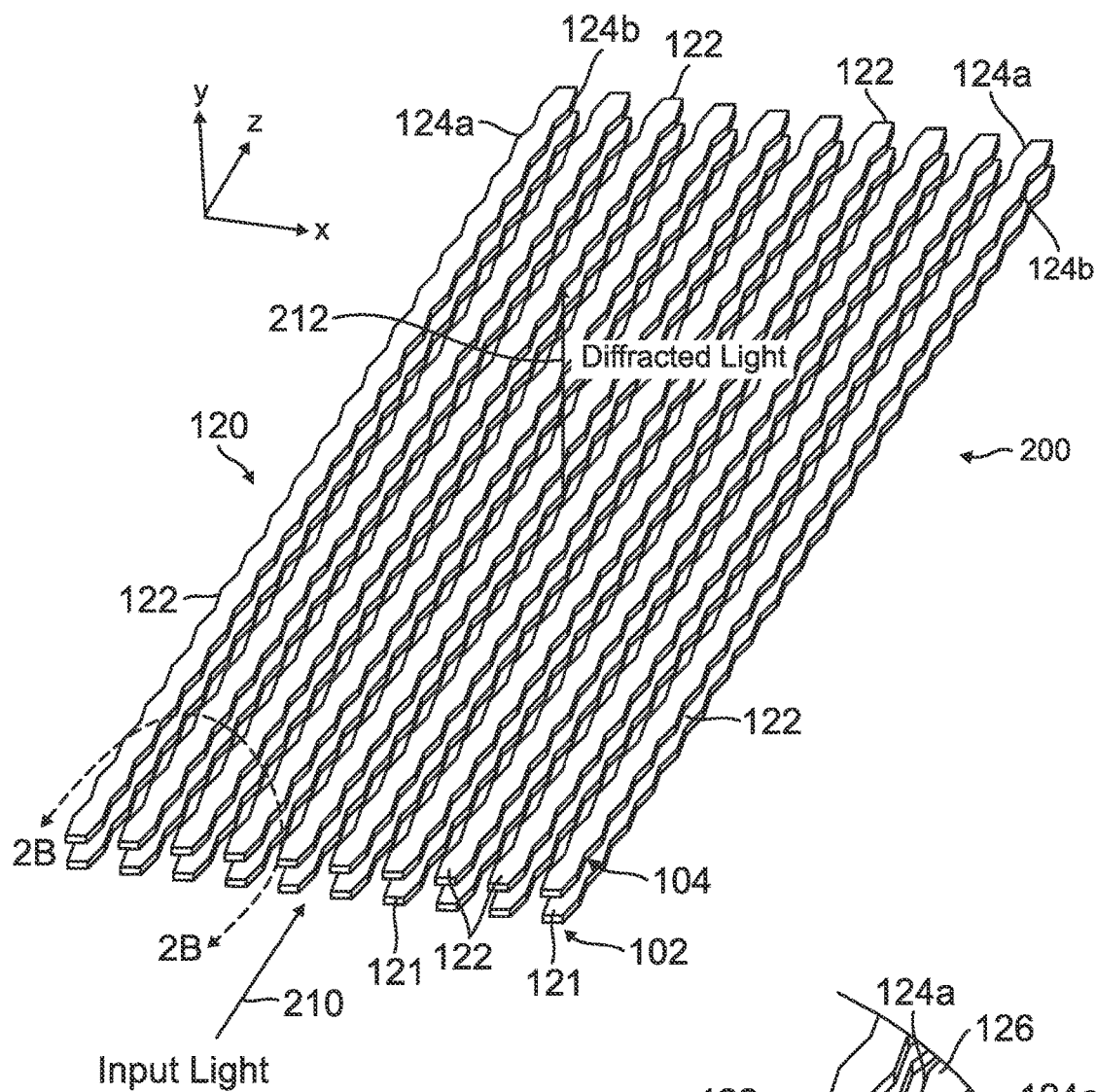
FIG. 2A is an end perspective view of a portion of a multilayer waveguide grating coupler according to one exemplary embodiment of the present application.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide an efficient grating coupler that may be used in a photonics chip to generate a relatively large beam of light out of the chip that has generally a transverse axis from a single waveguide that is supplying the light. The relatively large beam of light may be several centimeters in diameter. The grating coupler, of embodiments, use two grating layers to suppress propagating light diffracted into the chip. Each grating layer is composed of copropagating waveguides. By controlling a vertical separation between the gratings and a relative longitudinal phase offset in the copropagating waveguides, downward-propagating diffraction of the light into the chip interferes destructively while upward-propagating diffraction of the light out of the chip interferes constructively. This allows for an overall diffraction efficiency increase while reducing an input optical power required to produce optical traps in free space.

Referring to FIG. 1, a general illustration of two grating layers made of copropagating waveguides that from a multilayer waveguide grating coupler 100 of an example embodiment is shown. The multilayer waveguide grating coupler 100 includes first grating 102 (or first waveguide layer) with a first plurality of copropagating waveguides 110 and a second grating 104 (second waveguide layer) with a second plurality of copropagating waveguides 112. As illustrated, in this example, light is directed into an end of the plurality of copropagating waveguides 110 and 112. The light beam exits out of the copropagating waveguides 110 and 112 in a direction that is generally perpendicular to the entry direction of the light into the ends of the waveguides 110 and 112. In the embodiment of FIG. 1, each waveguide of the copropagating waveguides 110 and 112 are formed parallel with each other. That is, in this example embodiment, light incident on an end of the copropagating waveguides 110 and 112 travels in the same direction in the parallel copropagating waveguides 110 and 112.

Figure 2B:
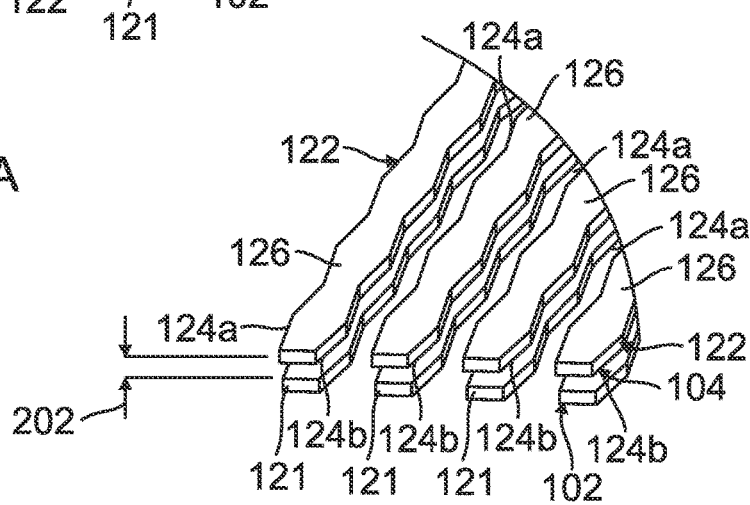
FIG. 2B is an end perspective view of a portion of the multilayer waveguide grating of FIG. 2A.

To diffract the light out of waveguides, the width of each waveguide 110 and 112 is periodically modulated along its length. This is illustrated in FIGS. 2A and 2B. In particular, FIGS. 2A and 2B illustrate a multilayer waveguide grating coupler 200 example with copropagating waveguides 121 and 122 of the first and second gratings 102 and 104 being periodically modulated in width to emit diffracted light beams in a controllable direction into free space. The copropagating waveguides 121 and 122 of each of the first and second gratings 102 and 104 of grating structure 120 may be closely spaced in distance to each other. For example, a spaced distance of about 0.3 microns to about 0.7 microns between each adjacent respective copropagating waveguide 121 and 122 may be used. Other embodiments may use other spaced distances. As described below in detail, a grating spaced distance 202 between the gratings 102 and 104 (waveguide layers) is one of the variables used to achieve a desired output light beam of the multilayer grating coupler 200.

As shown in FIG. 2B, each waveguide 122 has opposing sidewalls 124a, 124b and a top wall 126 between the sidewalls. Waveguides 121 also have opposing sidewalls and a top wall between the sidewalls. A width of each waveguide 122 is defined by a distance between opposing sidewalls 124a, 124b. The width of each waveguide 122 is varied periodically such that a width of top wall 126 is also varied periodically. As such, opposing sidewalls 124a, 124b each have a periodic structure that produces a sidewall modulation for each waveguide 122. Thus, each waveguide 122 has a periodic change in width along a propagation direction based on the periodic structure of their opposing sidewalls, such that each waveguide is individually modulated by the periodic change in the width.

As shown in FIGS. 2A and 2B, each of the copropagating waveguides 121 and 122 in the first and second gratings 102 and 104 uniformly narrows and widens along the length of the waveguide, which produces the sidewall modulation. The sidewall modulation of each of the waveguides 121 and 122 leads to periodic perturbations of an input light beam 210, such as a wave that is confined along the vertical axis and collimated along the horizontal axis, propagating through grating structure 120, which in turn leads to a diffracted light beam 212 that is directed out of grating structure 120 into free space as illustrated in FIG. 2A.

The angle of diffraction can be determined by the spatial period of the sidewall modulation, which is the physical length over which the waveguide is narrowed, widened, and narrowed again. The spatial period of the sidewall modulation can have a length of about 0.3 microns to about 2 microns, for example. Other example embodiments will have a different spatial period.

As further shown in FIG. 2A, an x-y-z coordinate system can be defined for grating structure 120. For individual waveguides 121 and 122 in grating structure 120, a position of a left sidewall 124a can be defined by expression (1) as:

$$x_{\text{left sidewall}} = x_0 - \left(\frac{w}{2} + a\sin\left(2\pi\frac{z}{\lambda}\right)\right) \quad (1)$$

where $x_0$ is the center of the waveguide, w is the unmodulated waveguide width, $\alpha$ is the sidewall modulation amplitude, and $\lambda$ is the grating period. Also, a position of a right sidewall 124b of the waveguide can be defined by expression (2) as:

$$x_{right\,sidewall} = x_0 + \left(\frac{w}{2} + a\sin\left(2\pi\frac{z}{\lambda} + \theta\right)\right) \quad (2)$$

where the additional variable, theta (θ), defines a phase shift between the modulation of the two sidewalls. When theta is equal to zero, the two modulations of the sidewalls are defined as being in-phase. In this case, the light scattered from left sidewall 124a is in-phase with the light scattered from right sidewall 124b. This results in complete constructive interference and a maximum value of the grating strength. In other alternative embodiments, when theta is equal to pi, the two modulations of the sidewalls are defined as being out-of-phase. In such cases, the light scattered from the left sidewall is out-of-phase with the light scattered from the right sidewall. This results in complete destructive interference and a zero value of the grating strength.

A grating strength of grating structure 120 is a function of an amplitude of the sidewall modulations for each waveguide 121 and 122. The sidewall modulation amplitude is defined as one fourth of the total change in width of the waveguide within a single period of the grating. As an example, consider a waveguide with a mean width of 500 nm. The right sidewall has a modulation amplitude of 10 nm, meaning it has a peak-to-peak modulation of 20 nm. The waveguide width then has a maximum value of 520 nm and a minimum width of 480 nm, with the difference between these values being 40 nm. One fourth of this value is 10 nm, which is again what is defined as the modulation amplitude. Just as the grating strength may be reduced by increasing the phase offset between the two waveguide sidewalls, the grating strength may also be reduced by directly reducing the modulation amplitude.

Further, light traveling in each waveguide 121 and 122 upward or downward is based on an angle relative to a surface normal of the chip. That angle is determined by the K-vector of the grating. The period of modulation of the width of the waveguides sets a K-vector of the grating. So, if a period of a grating is very long, which corresponds to small K-vector for the grating, the light will diffract the light out of the chip generally in the direction the input light is traveling into the waveguides 121 and 122. Further if a very short period of modulation is used, the grating will have a high K-vector. With a high enough K-vector the light will diffract back in the direction it came from. Hence, the modulation of the period can be selected between the very long period and the very short period to achieve a desired diffraction of the light traveling in the waveguides at a desired angle out of the grating coupler.

Figure 3A:
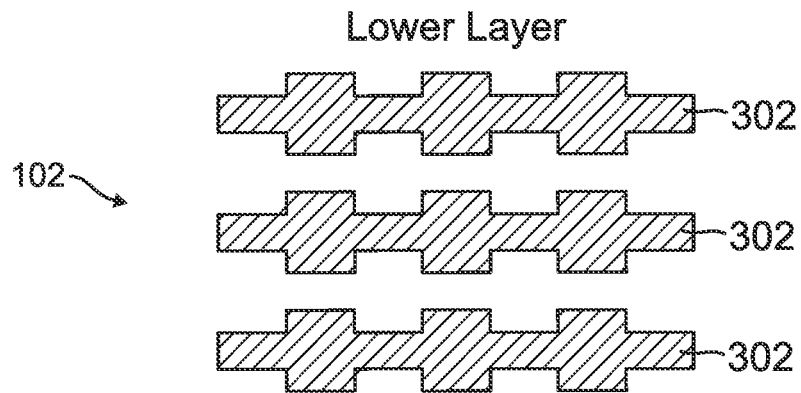
FIG. 3A is a top view illustration of a portion of copropagating waveguides in a first grating.
Figure 3B:
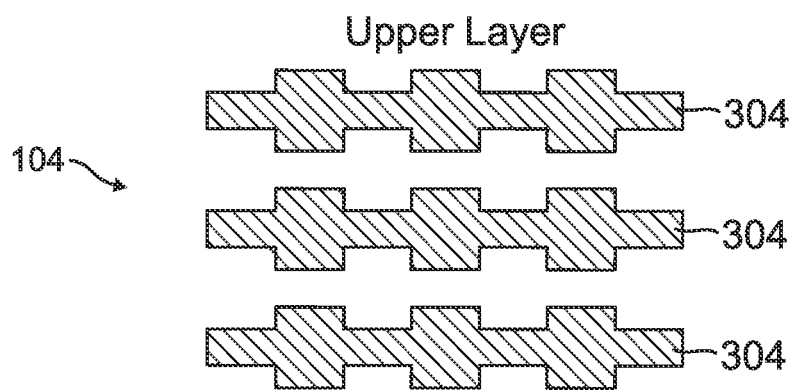
FIG. 3B is a top view illustration of a portion of copropagating waveguides a second grating.
Figure 3C:
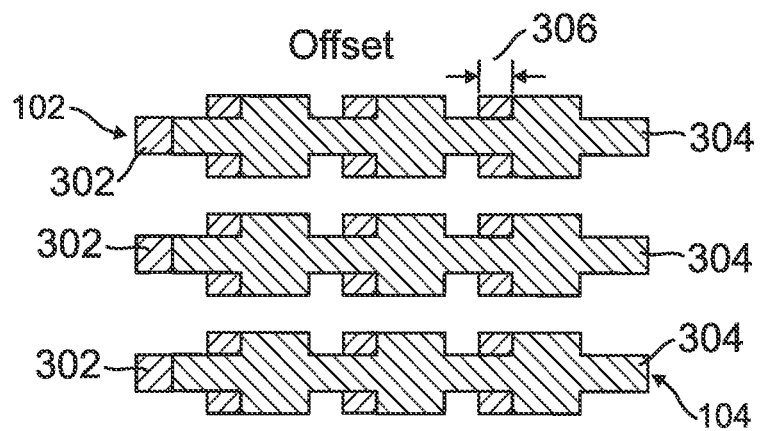
FIG. 3C is a top view of the positioning of first grating and the second grating to achieve a desired phase offset between copropagating waveguides in the first and second gratings of one exemplary embodiment of the present application.

As discussed above, by controlling the grating spaced distance 202 between the first grating 102 and the second grating 104 and a relative longitudinal phase offset in the waveguides 110 and 112, downward-propagation diffraction interferes destructively and while upward-propagating diffraction interferes constructively. The phase offset is illustrated in FIGS. 3A through 3B. FIG. 3A provides a top view illustration of a portion of the first or lower grating 102. This example first grating 102 includes copropagating waveguides 302 that are periodically modulated in width along a length of the waveguides 302. FIG. 3B provides a top view illustration of a portion of the second or upper grating 104. This example second grating 104 includes copropagating waveguides 304 that are also periodically modulated in width along a length of the waveguides 304. FIG. 3C provides a top view illustration of how the copropagating waveguides 304 in the second grating 104 align with the copropagating waveguides 302 in the first grating 102 to achieve a phase offset 306.

A phase offset 306 in which the first copropagating waveguides 302 is narrowed exactly when the second copropagating waveguides 304 are widened will result in gratings of the multilayer waveguide grating coupler being 180 degrees out of phase. 180 degrees out of phase means one grating (one of the copropagating waveguides in one of the gratings 102 and 104) is shifted relative to the other grating by λ/2 where λ is the special period of the periodic modulation. 90 degrees would be λ/4 and 45 degrees would be λ/8, etc. The phase offset example of FIG. 3C is λ/4.

One example method in determining a grating spaced distance 202 and phase offset 306 to create a multilayer waveguide grating coupler with the desired characteristic is by running a finite difference simulation in a loop that maximizes the power diffraction in the upward direction and minimizes the power diffraction in the downward direction by varying the grating spaced distance 202 and phase offset 306.

Figure 4:
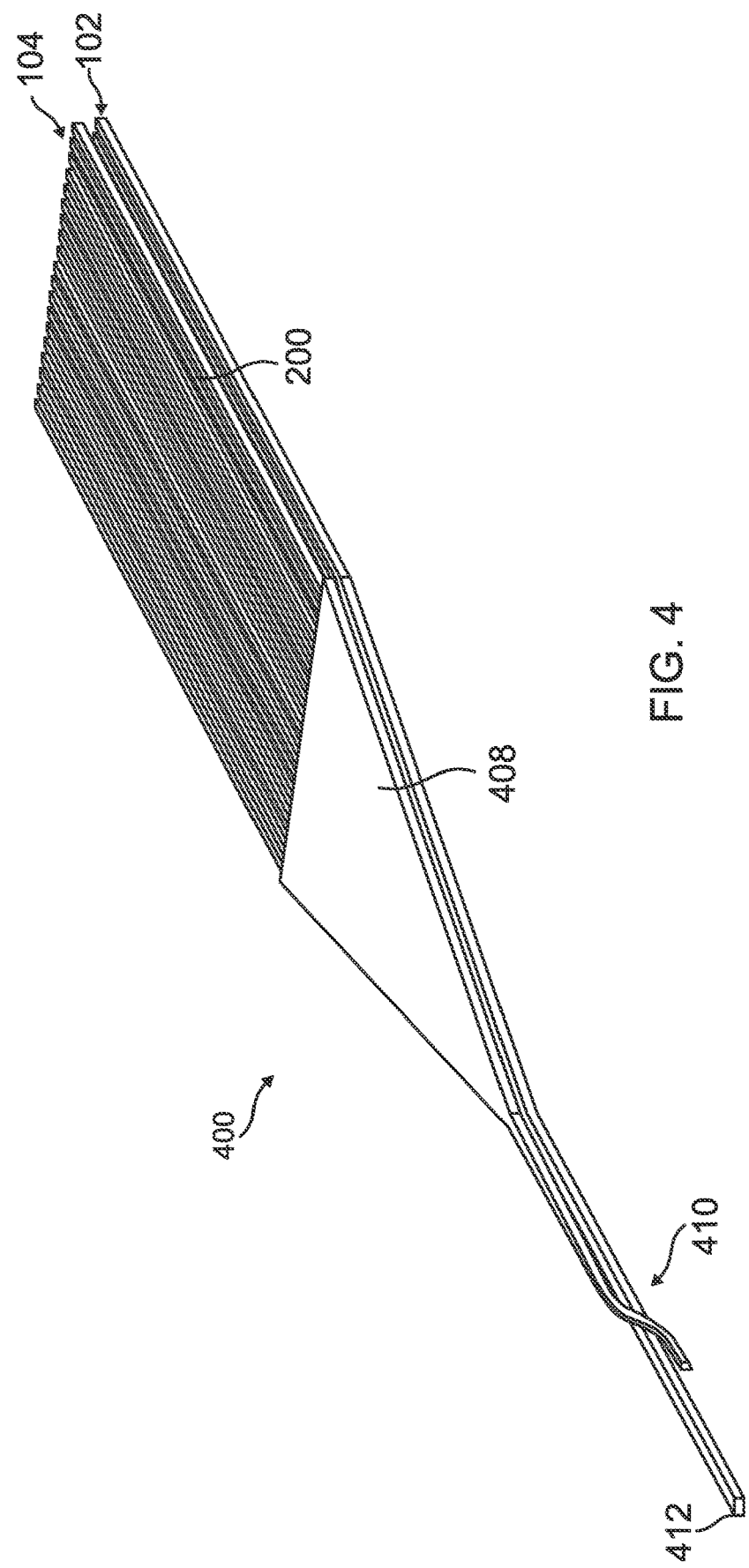
FIG. 4 is a side perspective view of a multilayer waveguide grating coupler assembly according to one exemplary embodiment.

FIG. 4 illustrates a multilayer waveguide grating coupler assembly 400 in one example embodiment. The multilayer waveguide grating coupler assembly 400 includes the multilayer waveguide grating coupler, such as multilayer waveguide coupler 200, that is made of two gratings 102 and 104 (or waveguide layers) of copropagating waveguides, such as copropagating waveguides 121 and 122 of FIGS. 2A and 2B. In optical communication with the multilayer waveguide grating coupler 200 is a mode expander 408. The mode expander 408 directs the light into each copropagating waveguides 121 and 122 in each grating 102 and 104. A mode converter portion 410 optically communicates the light from a single input waveguide 412, such as a fiber, into the mode expander 408.

Figure 5:
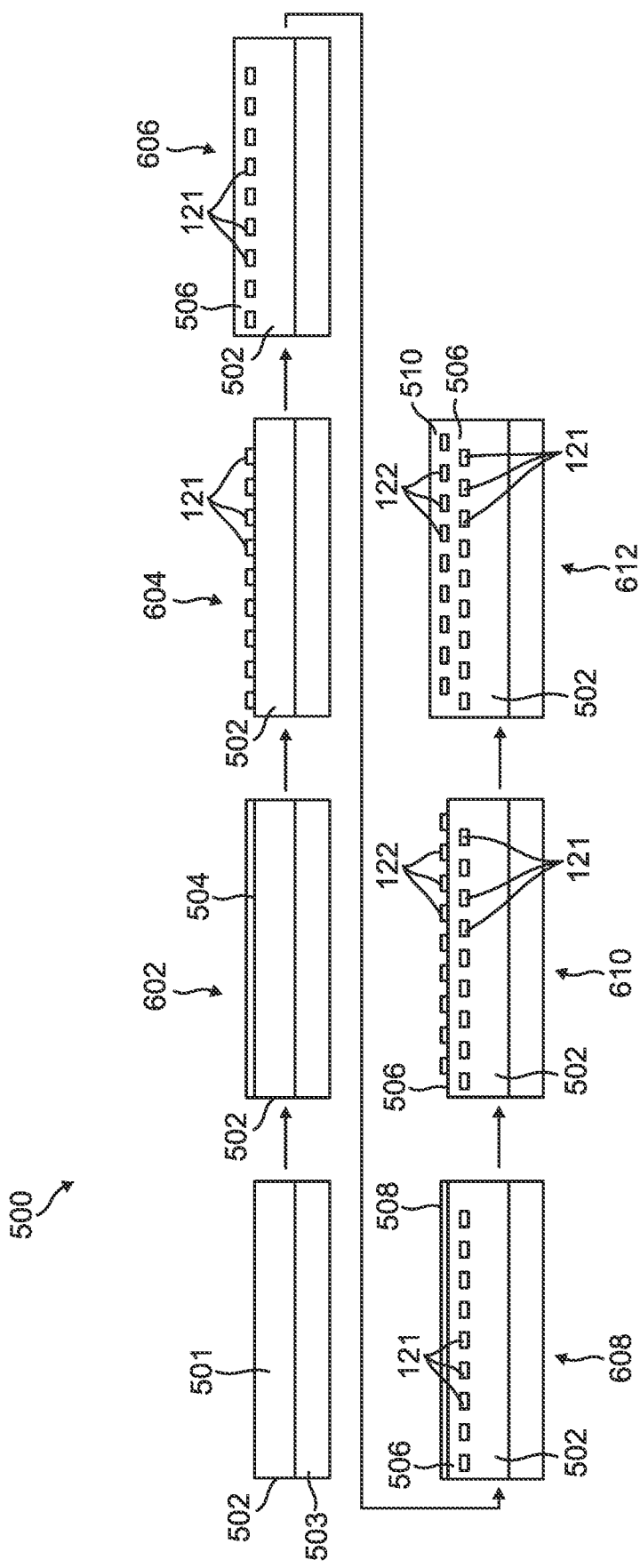
FIG. 5 is a side view illustrating the formation of a multilayer waveguide grating coupler according to one exemplary embodiment.
Figure 6:
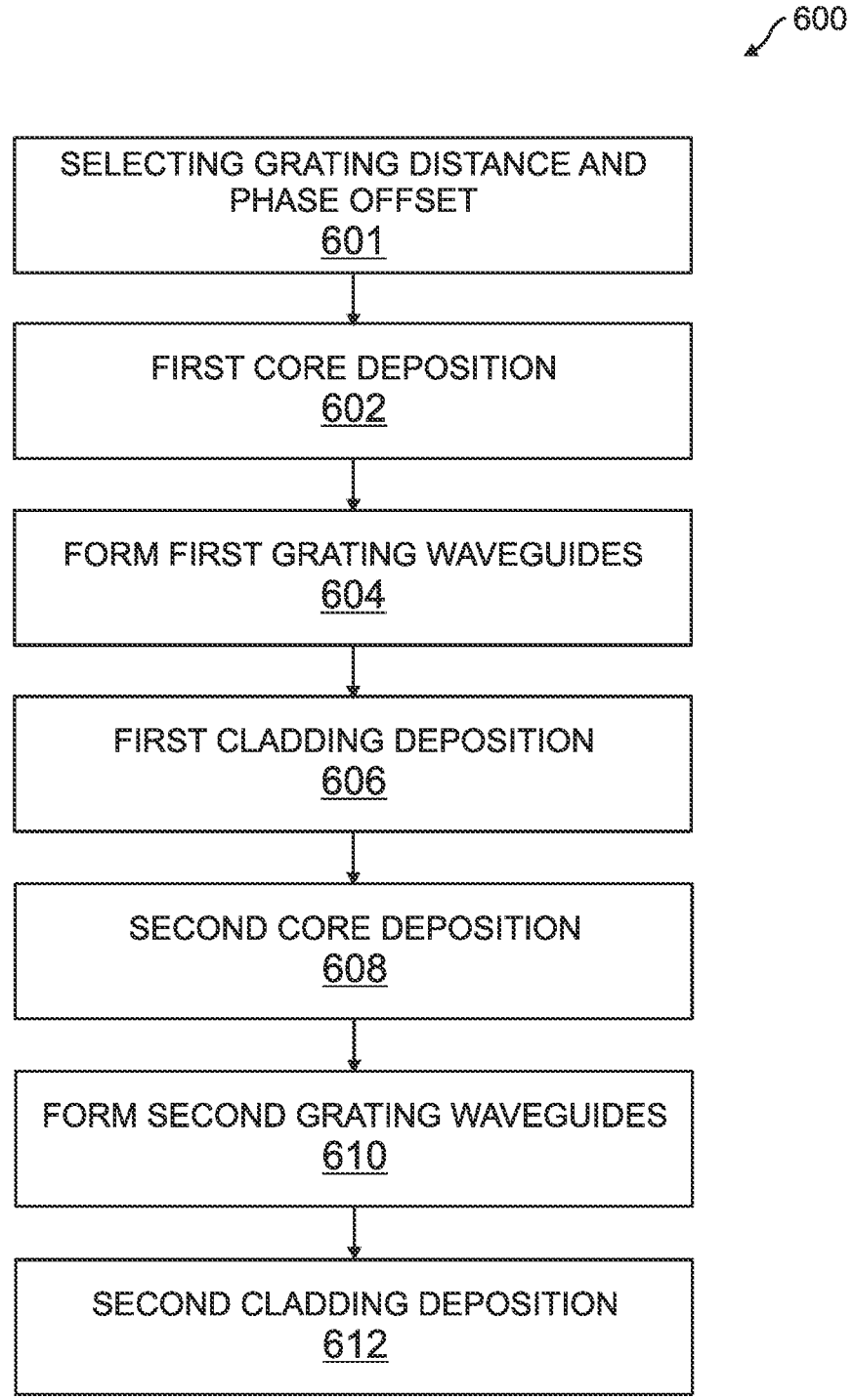
FIG. 6 is a multilayer waveguide grating coupler formation flow diagram according to one exemplary embodiment.

An example of the formation of a multilayer waveguide grating coupler, such as multilayer grating coupler 200 is described in relation to the side views of the fabrication process 500 illustrated in FIG. 5 and the multilayer waveguide grating coupler formation flow diagram 600 illustrated in FIG. 6. Other techniques as well as different flow diagram blocks in a different order may be used to form the multilayer waveguide grating coupler in other embodiments. The process of flow diagram 600 of FIG. 6 starts by determining a grating distance 202 and phase offset 306 at block (601) that provides a desired light beam out of multilayer waveguide grating coupler 200. Once that is determined, the process can start the fabrication process 500 as set out in FIG. 5.

As illustrated in FIG. 5, the process starts with the use of an initial wafer substrate 502. In one example embodiment, the initial wafer substrate 502 includes a first layer of cladding material, such as a thermal oxide 501 on a silicon layer 503. A first layer of core material 504 is deposited on the initial wafer substrate 502 at block (602) as illustrated in FIG. 5 and the flow diagram 600 FIG. 6. The layer of core material 504 has a higher refractive index than the cladding material (thermal oxide 501 of the wafer substrate 502 in one example embodiment). The first layer of core material 504 is then formed into the first grating 102 of copropagating waveguides 121 at block (604). In one embodiment, this may be done by known lithography, etching and resist removal techniques.

A deposition of a second layer of cladding material 506 is then deposited on the formed first layer of copropagating waveguides 121 at block (606). The second layer of cladding material 506 has a lower refractive index than the deposited first layer of core material 504. Once the second layer of cladding material 506 is deposited on the formed first layer of waveguides 121 of the first grating 102, a second layer of core material 508 is deposited on the second layer of cladding material 506 at block (608). This second layer of core material 508 has a higher refractive index than the second layer of cladding material 506.

At block (610), the second layer of core material 508 is formed into copropagating waveguides 122 of the second grating 104. This may be done with known lithography, etching and resist removal techniques. To achieve a desired phase offset between the copropagating waveguides 121 and 122 in the gratings 102 and 104, alignment marks may be used when applying a mask during the lithography process when forming copropagating waveguides 122 to get a desired alignment with copropagating waveguides 121. Once the copropagating waveguides 122 are formed, a third layer of cladding material 510 is deposited over the copropagating waveguides at block (612). The third layer of cladding material 510 has lower index of refraction than the copropagating waveguides 122.

Example material used for the substrate 502 and the cladding layers 506 and 510 composed with lower refractive index, may be formed from, but are not limited to, silicon dioxide ($SiO_2$), aluminum oxide ($Al_2O_3$), magnesium oxide (MgO), or potassium chloride (KCl) material. Example material with the higher refractive index used to form the gratings 102 and 104 include, but are not limited to, silicon nitride ($Si_3N_4$), silicon (Si), titanium dioxide ($TiO_2$), gallium arsenide (GaAs), or gallium nitride (GaN) material.

Figure 7:
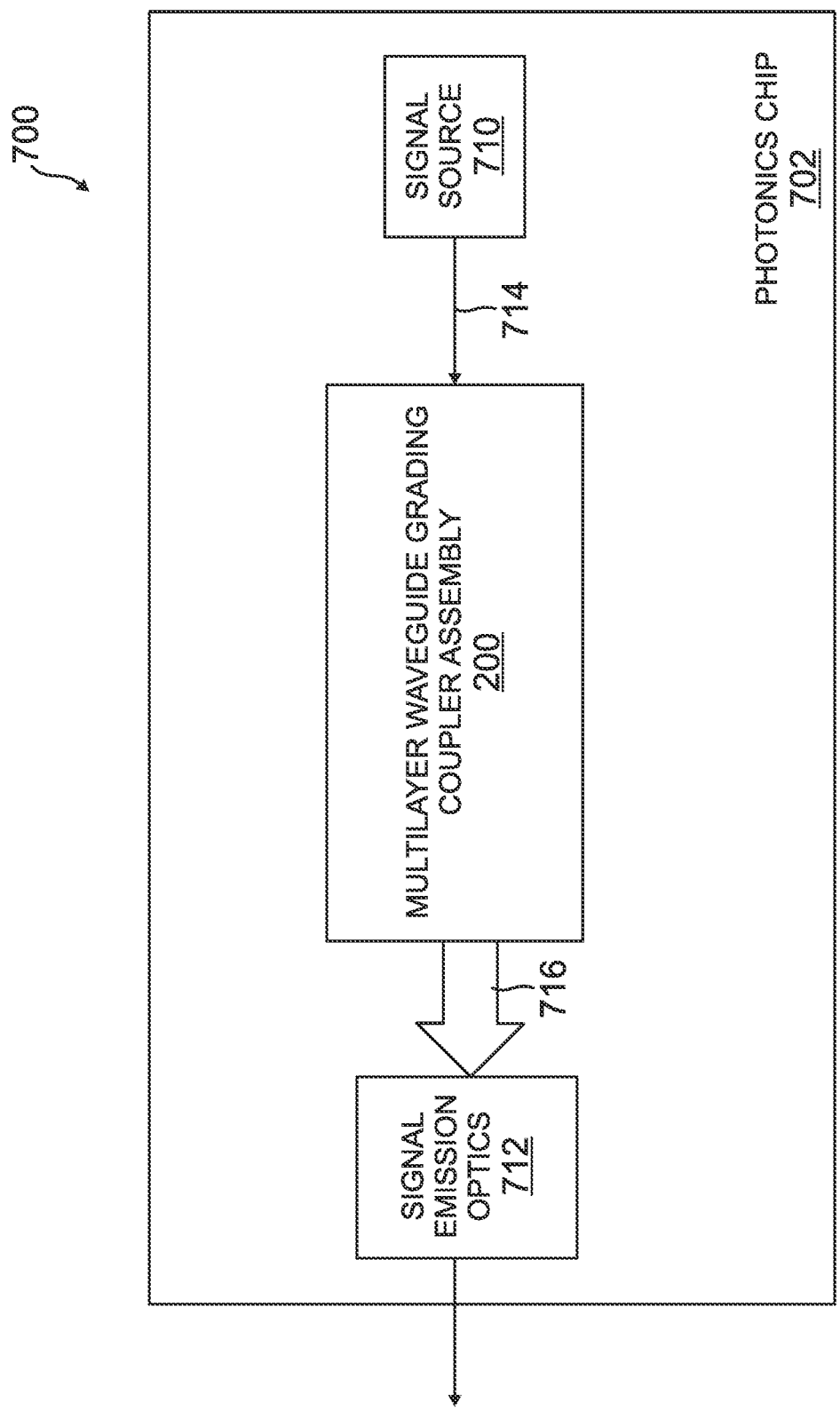
FIG. 7 is a block diagram of the photonics chip integrating a multilayer waveguide grating coupler according to one exemplary embodiment.

An example of a circuit 700 with a photonics chip 702 that includes a multilayer waveguide grating coupler assembly 400 of an example embodiment is illustrated in the block diagram of FIG. 7. The photonics chip 702 includes a signal source 710 to generate light that is optically communicated to an optical waveguide 714 such as a fiber. The signal source 710 can include a signal generating device such as a laser. The optical waveguide 714 communicates the generated light to the multilayer waveguide grating coupler assembly 400. The multilayer waveguide grating coupler 200 outputs a light beam 716 to signal emission optics 712. The signal emission optics 712 in turn outputs the light from the photonics chip 702 in this example embodiment.

EXAMPLE EMBODIMENTS

Example 1 includes a multilayer waveguide coupler comprising a first grating and a second grating. The first grating has a plurality of first copropagating waveguides. Each first copropagating waveguide has a first periodically modulated width. The second grating has a plurality of second copropagating waveguides positioned a grating space distance from the first grating. Each second copropagating waveguide has a second periodically modulated width. The second grating is positioned so that a phase offset is present between the first periodically modulated width of the first copropagating waveguides and the second periodically modulated width of the second copropagating waveguides. The grating spaced distance and phase offset are selected so that light diffracted out of the first copropagating waveguides and the second copropagating waveguides in the first direction interferes constructively to form the first light beam and light diffracted out of the first copropagating waveguides and the second copropagating waveguides in the second direction interferes destructively.

Example 2 includes the multilayer waveguide grating coupler of Example 1, wherein the grating spaced distance and phase offset are selected so that a power of a first light beam is diffracted out of the first copropagating waveguides and the second copropagating waveguides in a first direction is maximized while the power of a second light beam diffracted out of the first copropagating waveguides and the second copropagating waveguides in a second direction is minimized.

Example 3 includes the multilayer waveguide grating coupler of any of the Examples 1-2, wherein the first periodically modulated width of each first copropagating waveguide has a same periodically modulated width as the second periodically modulated width of each second copropagating waveguide.

Example 4 includes the multilayer waveguide grating coupler of any of the Examples 1-3, further including a mode expander, an input waveguide and a mode converter portion. The mode expander is in optical communication with the plurality of first copropagating waveguides in the first grating and the plurality of second copropagating waveguides in the second grating. The input waveguide is configured to receive an input light. The mode converter portion is configured to pass the input light to the mode expander.

Example 5 includes the multilayer waveguide grating coupler of any of the Examples 1-4, wherein the first grating and the second grating are formed in a photonics chip.

Example 6 includes the multilayer waveguide grating coupler of Example 5, wherein the first direction is a direction out of the photonics chip and the second direction is a direction into the photonics chip.

Example 7 includes the multilayer waveguide grating coupler of any of the Examples 1-6, further including a layer of cladding of a select thickness separating the first grating from the second grating to define the grating spaced distance.

Example 8 includes the multilayer waveguide grating coupler of Example 7, further wherein: the layer of cladding in made from one of silicon dioxide ($SiO_2$), aluminum oxide ($Al_2O_3$), magnesium oxide (MgO) and potassium chloride (KCl); and the first and second copropagating waveguides are made from one of silicon nitride ($Si_3N_4$), silicon (Si), titanium dioxide ($TiO_2$), gallium arsenide (GaAs) and gallium nitride (GaN).

Example 9 includes a photonics chip with a multilayer waveguide grating coupler. The photonics chip includes a signal source and a multilayer waveguide grating coupler. The signal source is configured to generate an input light. The multilayer waveguide grating coupler is in optical communication with the signal source to receive the input light. The multilayer waveguide grating coupler includes at least one first grating and at least one second grating. The at least one first grating has a plurality of first copropagating waveguides. Each first copropagating waveguide has a first periodically modulated width.

The at least one second grating has a plurality of second copropagating waveguides positioned a grating spaced distance from the first grating. Each second copropagating waveguide has a second periodically modulated width. The second grating positioned so that a phase offset is present between the first periodically modulated width of the first copropagating waveguides and the second periodically modulated width of the second copropagating waveguides. The grating spaced distance and the phase offset are selected so that light diffracted in a first direction from the first copropagating waveguides and the second copropagating waveguides interferes constructively to form a first light beam and light diffracted in a second direction from the first copropagating waveguides and the second copropagating waveguides interferes destructively.

Example 10 includes the photonics chip of Example 9 further including signal emission optics in optical communication with the multilayer waveguide grating coupler to generate a light beam output from the first light beam diffracted in the first direction.

Example 11 includes the photonics chip of any of the Examples 9-10, wherein the multilayer waveguide grating coupler further includes a mode expander, an input waveguide and a mode convertor portion. The mode expander is in optical communication with the plurality of first copropagating waveguides in the first grating and the plurality of second copropagating waveguides in the second grating. The input waveguide is coupled to pass input light to the mode expander. The mode converter portion is configured to pass the input light to the mode expander.

Example 12 includes the photonics chip of any of the Examples 9-11, wherein the multilayer waveguide grating coupler further includes a layer of cladding of a select thickness separating the first grating from the second grating to define the grating spaced distance.

Example 13 includes the photonics chip of any of the Examples 9-12 wherein the multilayer waveguide grating coupler further includes a first layer of cladding upon which the first grating is formed; and a second layer of cladding upon which the second grating is formed, the second layer of cladding setting the grating spaced distance.

Example 14 includes the photonics chip of Example 13, wherein the first layer of cladding and the second layer of cladding have a lower index of refraction than the first grating and the second grating.

Example 15 is a method of forming a multilayer waveguide grating coupler. The method includes depositing a first layer of core material on a first layer of cladding material. Forming a first grating having a plurality of copropagating first waveguides from the first core material. Each first waveguide of the plurality of copropagating first waveguides having a first periodic modulation of a width of the first waveguide. Depositing a second layer of cladding material of a select thickness over the first grating. Depositing a second layer of core material over the second layer of cladding material. Forming a second grating having a plurality of copropagating second waveguides from the second layer of core material. Each second waveguide of the plurality of copropagating second waveguides having a second periodic modulation of a width of the second waveguide. The formed second grating positioned to create a select phase offset between the first periodic modulations of the width of the first waveguides and the second periodic modulations of the width of the second waveguides.

Example 16 includes the method of Example 15, further including using at least one marker to align the second grating with the first grating to set the select phase offset.

Example 17 includes the method of any of the Examples 15-16, further including selecting the thickness of the second layer of cladding material and the phase offset so that light diffracted in a first direction from the plurality of copropagating first waveguides and the plurality of second copropagating waveguides interferes constructively to form a first light beam in a first direction and the light diffracted in a second direction from the plurality of copropagating first waveguides and the plurality of second copropagating waveguides interferes destructively.

Example 18 includes the method of any of the Examples 15-17, further comprising depositing a third layer of cladding material over the formed second grating.

Example 19 includes the method of Examples 19, wherein the first layer of cladding material, the second layer of cladding material and the third layer of cladding material have a lower index of refraction than the first layer of core material and the second layer of core material.

Example 20 includes the method of Examples 18, further wherein the first layer of cladding material, the second layer of cladding material and the third layer of cladding material are made from at least one of silicon dioxide ($SiO_2$), aluminum oxide ($Al_2O_3$), magnesium oxide (MgO), and potassium chloride (KCl); and the first layer of core material and the second layer of core material is made from at least one of silicon nitride ($Si_3N_4$), silicon (Si), titanium dioxide ($TiO_2$), gallium arsenide (GaAs), and gallium nitride (GaN).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A multilayer waveguide grating coupler comprising:
   a first grating having a plurality of first copropagating waveguides, each first copropagating waveguide having a first periodically modulated width; and
   a second grating having a plurality of second copropagating waveguides positioned a grating space distance from the first grating, each second copropagating waveguide having a second periodically modulated width, the second grating positioned so that a phase offset is present between the first periodically modulated width of the first copropagating waveguides and the second periodically modulated width of the second copropagating waveguides, the grating spaced distance and phase offset selected so that light diffracted out of the first copropagating waveguides and the second copropagating waveguides in the first direction interferes constructively to form the first light beam and light diffracted out of the first copropagating waveguides and the second copropagating waveguides in the second direction interferes destructively.

2. The multilayer waveguide grating coupler of claim 1, wherein the grating spaced distance and phase offset are selected so that a power of a first light beam diffracted out of the first copropagating waveguides and the second copropagating waveguides in a first direction is maximized while a power of a second light beam diffracted out of the first copropagating waveguides and the second copropagating waveguides in a second direction is minimized.

3. The multilayer waveguide grating coupler of claim 1, wherein the first periodically modulated width of each first copropagating waveguide has a same periodically modulated width as the second periodically modulated width of each second copropagating waveguide.

4. The multilayer waveguide grating coupler of claim 1, further comprising:
   a mode expander in optical communication with the plurality of first copropagating waveguides in the first grating and the plurality of second copropagating waveguides in the second grating;
   an input waveguide configured to receive an input light; and
   a mode converter portion configured to pass the input light to the mode expander.

5. The multilayer waveguide grating coupler of claim 1, wherein the first grating and the second grating are formed in a photonics chip.

6. The multilayer waveguide grating coupler of claim 5, wherein the first direction is a direction out of the photonics chip and the second direction is a direction in to the photonics chip.

7. The multilayer waveguide grating coupler of claim 1, further comprising:
a layer of cladding of a select thickness separating the first grating from the second grating to define the grating spaced distance.

8. The multilayer waveguide grating coupler of claim 7, further wherein:
the layer of cladding in made from one of silicon dioxide ($SiO_2$), aluminum oxide ($Al_2O_3$), magnesium oxide (MgO) and potassium chloride (KCl); and
the first and second copropagating waveguides are made from one of silicon nitride ($Si_3N_4$), silicon (Si), titanium dioxide ($TiO_2$), gallium arsenide (GaAs) and gallium nitride (GaN).

9. A photonics chip with a multilayer waveguide grating coupler, the photonic chip comprising:
a signal source configured to generate an input light; and
a multilayer waveguide grating coupler in optical communication with the signal source to receive the input light, the multilayer waveguide grating coupler including,
at least one first grating having a plurality of first copropagating waveguides, each first copropagating waveguide having a first periodically modulated width; and
at least one second grating having a plurality of second copropagating waveguides positioned a grating spaced distance from the first grating, each second copropagating waveguide having a second periodically modulated width, the second grating positioned so that a phase offset is present between the first periodically modulated width of the first copropagating waveguides and the second periodically modulated width of the second copropagating waveguides, the grating spaced distance and the phase offset being selected so that light diffracted in a first direction from the first copropagating waveguides and the second copropagating waveguides interferes constructively to form a first light beam and light diffracted in a second direction from the first copropagating waveguides and the second copropagating waveguides interferes destructively.

10. The photonics chip of claim 9, further comprising:
signal emission optics in optical communication with the multilayer waveguide grating coupler to generate a light beam output from the first light beam diffracted in the first direction.

11. The photonics chip of claim 9, wherein the multilayer waveguide grating coupler further comprises:
a mode expander in optical communication with the plurality of first copropagating waveguides in the first grating and the plurality of second copropagating waveguides in the second grating;
an input waveguide coupled to pass input light to the mode expander; and
a mode converter portion configured to pass the input light to the mode expander.

12. The photonics chip of claim 9, wherein the multilayer waveguide grating coupler further comprises:
a layer of cladding of a select thickness separating the first grating from the second grating to define the grating spaced distance.

13. The photonics chip of claim 9, wherein the multilayer waveguide grating coupler further comprises:
a first layer of cladding upon which the first grating is formed; and
a second layer of cladding upon which the second grating is formed, the second layer of cladding setting the grating spaced distance.

14. The photonics chip of claim 13, further wherein:
the first layer of cladding and the second layer of cladding having a lower index of refraction than the first grating and the second grating.

15. A method of forming a multilayer waveguide grating coupler, the method comprising:
depositing a first layer of core material on a first layer of cladding material;
forming a first grating having a plurality of copropagating first waveguides from the first core material, each first waveguide of the plurality of copropagating first waveguides having a first periodic modulation of a width of the first waveguide;
depositing a second layer of cladding material of a select thickness over the first grating;
depositing a second layer of core material over the second layer of cladding material; and
forming a second grating having a plurality of copropagating second waveguides from the second layer of core material, each second waveguide of the plurality of copropagating second waveguides having a second periodic modulation of a width of the second waveguide, the formed second grating positioned to create a select phase offset between the first periodic modulations of the width of the first waveguides and the second periodic modulations of the width of the second waveguides.

16. The method of claim 15 further comprising:
using at least one marker to align the second grating with the first grating to set the select phase offset.

17. The method of claim 15, further comprising:
selecting the thickness of the second layer of cladding material and the phase offset so that light diffracted in a first direction from the plurality of copropagating first waveguides and the plurality of second copropagating waveguides interferes constructively to form a first light beam in a first direction and the light diffracted in a second direction from the plurality of copropagating first waveguides and the plurality of second copropagating waveguides interferes destructively.

18. The method of claim 15, further comprising:
depositing a third layer of cladding material over the formed second grating.

19. The method of claim 18, wherein the first layer of cladding material, the second layer of cladding material and the third layer of cladding material have a lower index of refraction than the first layer of core material and the second layer of core material.

20. The method of claim 18, further wherein:
the first layer of cladding material, the second layer of cladding material and the third layer of cladding material are made from at least one of silicon dioxide ($SiO_2$), aluminum oxide ($Al_2O_3$), magnesium oxide (MgO), and potassium chloride (KCl); and
the first layer of core material and the second layer of core material is made from at least one of silicon nitride ($Si_3N_4$), silicon (Si), titanium dioxide ($TiO_2$), gallium arsenide (GaAs), and gallium nitride (GaN).

* * * * *